United States Patent [19]

Nguyen

[11] Patent Number: 4,495,163

[45] Date of Patent: Jan. 22, 1985

[54] FLUIDIZED BED SULFUR DIOXIDE REMOVAL

[75] Inventor: Xuan T. Nguyen, Montreal, Canada

[73] Assignee: Domtar Inc., Montreal, Canada

[21] Appl. No.: 457,180

[22] Filed: Jan. 11, 1983

Related U.S. Application Data

[63] Continuation-in-part of Ser. No. 352,176, Feb. 25, 1982, abandoned.

[51] Int. Cl.$^3$ .......................... B01J 8/00; C01B 17/00
[52] U.S. Cl. .................................. 423/244; 423/242; 110/345
[58] Field of Search .......... 423/242 A, 242 R, 244 A, 423/244 R; 110/343, 345

[56] References Cited

U.S. PATENT DOCUMENTS

| | | | |
|---|---|---|---|
| 3,717,700 | 2/1973 | Robinson et al. | 110/345 |
| 3,870,480 | 3/1975 | Moss | 423/244 |
| 4,081,513 | 3/1978 | Moss | 423/242 |

Primary Examiner—Gregory A. Heller
Attorney, Agent, or Firm—Antoine H. Gauvin

[57] ABSTRACT

Method of stripping $SO_2$ (sulfur dioxide) from flue gases by passing the $SO_2$ containing gas through to a bed of particles to fluidize the particles and to form a fluidized bed, injecting a reaction chemical into the bed and reacting it with $SO_2$ in the fluidized bed thereby to form particles of a combined product, combining the particles with other such particles in the fluidized bed to form bigger pellets and to exhaust gases from the bed relatively free of $SO_2$ at a temperature as low as possible but high enough to prevent the condensation of the moisture present in the gas stream by adjusting the concentration and feeding rate of the reaction chemical. During that process at least some of the pellets so formed are discarded from the bed. In the preferred arrangement the reaction chemicals are injected into the bed in an aqueous medium and gas entering the bed is at elevated temperature in the order of 200°–300° C. and evaporates the aqueous medium is evaporated to form a dry combined product.

8 Claims, 3 Drawing Figures

FLUIDIZED BED SULFUR DIOXIDE REMOVAL

This application is a continuation-in-part of application Ser. No. 352,176 filed Feb. 25, 1982 now abandoned.

FIELD OF THE INVENTION

Present invention relates to a fluidized bed system for removal of sulfur dioxide ($SO_2$) (and fly ash) from flue gases. More specifically the present invention relates to an efficient fluidized bed system for recovery of $SO_2$ from flue gases as a dry composition in particle form.

PRIOR ART

In the combustion process, particularly in the burning of coal, $SO_2$ and dust are generated from the sulphur and ash content of the coal and this $SO_2$ unless removed from the flue gases passes up the stack and is dissipated into the atmosphere where it forms acid rain. It has recently been established that acid rain is significantly altering the pH of lakes and of the countryside even in remote areas and that these changes in pH are very detrimental to the ecology. In fact, in some regions the lowered pH has resulted in extermination of all fish life. The emission of fly ash from the stack has been deemed objectionable for other reasons.

Steps have been taken to reduce sulphur and particulate emissions by removing the sulphur and fly ash from the flue gases before they are released to the atmosphere. Techniques for sulphur removal include wet scrubbing wherein the $SO_2$ containing gases are sprayed with a solution or slurry generally of an alkali material, e.g., lime, limestone, magnesium oxide etc. or combinations thereof which react with the sulphur to form compounds (generally solid) such as calcium sulfite or magnesium sulphite which leaves the scrubber as a wet slurry and are disposed of.

Fly ash, when present is normally separated from the flue gas in a bag house or electrostatic precipitation in what is generally referred to as a primary particulate removal operation. This primary particulate removal operation is carried out upstream of the $SO_2$ wet scrubbing removal system. Fly ash that may carry over into the scrubbing operation is washed from the gas and forms part of the wet sludge formed in the scrubber and is disposed of with the sludge.

Attempts have been made to produce a dry by-product by chemically combining the $SO_2$ in the flue gas. Such devices may take the form of spray dryers wherein a solution or slurry of say lime is sprayed into the hot flue gas and the lime combines with the $SO_2$ to form a mixture of $CaSO_3/CaSO_4$ while the heat from the flue gas evaporates the water and dries the mixture. This dry product is then captured, for example in a bag house or the like downstream of the spray drier and removed. The spray drying system permits elimination of the primary particulate removal operation and the bag house downstream of the spray drier also used to capture fly ash particles.

It is also well known, particularly in the pharmaceutical industry, to utilize the fluidized bed as a dryer and granulater in a process that is often called spray granulation. This process has been known for some time as a batch granulation process and has recently been made continuous utilizing a combination of spray drying and fluidized bed drying for particle formation and growth. With this process feed liquor is atomized and sprayed into a fluidized layer of already dried or partially dried particles. The fluidizing medium being the drying air.

It is also well known in the Pulp and Paper industry particularly with the neutral sulphite process and more recently with the Kraft process, to burn residual liquor in a fluidized bed thereby to convert the inorganics in the liquor into pellets composed primarily of sodium sulphate and sodium carbonate. Pellet growth occurs as the material is oxidized at about the utectic temperature of the inorganic materials and the newly formed material is rendered adherent and is bound to the nuclei in the bed. Growth of the pellets in layers is sometimes referred to as onion type pellet growth.

The closest reference found in the prior art namely U.S. Pat. No. 4,081,513 as invented by Moss, teached taking $SO_2$ containing gas at about 1060°, mixing it with air to provide oxygen and to lower the gas temperature to 800°–900° C. The gas is then pretreated in a fluidized bed and leaves at a temperature in the order of 250° to 350° C. where it is depleted in $SO_2$. The $SO_2$ depleted gas is then further treated in a scrubber to remove all the remaining $SO_2$ and any other sulphur oxides as indicated in column 5 line 15 of the patent. Thus the fluidized bed stage here acts like a pretreatment. If the fluid bed were good enough, the scrubber would be absent.

BROAD DESCRIPTION OF THE INVENTION

The main object of the present invention is to provide an efficient system for sulphur dioxide recovery from gas streams preferably at elevated temperatures utilizing a spray of an aqueous slurry or solution of a reaction chemical into a bed of pellets fluidized by the gas stream containing the $SO_2$ to be captured and forming dry pellets containing a combined product of the reaction chemical and $SO_2$, and exhausting gases from said bed substantially free of $SO_2$ at a temperature as low as possible but high enough to prevent the condensation of the moisture present in the gas stream by adjusting the concentration and feeding rate of said reaction chemical, and to recover a portion of said pellets from said bed for disposal.

Broadly the present invention relates to a method of stripping $SO_2$ from gases comprising providing a bed of pellets, passing $SO_2$ containing gases through said bed to fluidize said pellets and to form a fluidized bed of said pellets, injecting a reaction chemical into the bed, reacting said $SO_2$ with said reaction chemical in said fluidized bed thereby to form a combined product which combines in said fluidized bed to form said pellets and exhausting gases from said bed substantially free of $SO_2$ at a temperature as low as possible but high enough to prevent the condensation of the moisture present in the gas stream by adjusting the concentration and feeding rate of said reaction chemical, and to discard a portion of said pellets from said bed for disposal. Preferably said reaction chemical will be injected in an aqueous medium and heat from said gas will evaporate said medium. In the event the $SO_2$ containing gas also contains fly ash the pellets so formed will also contain fly ash.

BRIEF DESCRIPTION OF THE DRAWINGS

Further features, objects, and advantages will be evident following detailed description of the preferred embodiments of the present invention taken in conjunction with the accompanying drawings in which.

DESCRIPTION OF THE PREFERRED EMBODIMENTS

Figure 1:
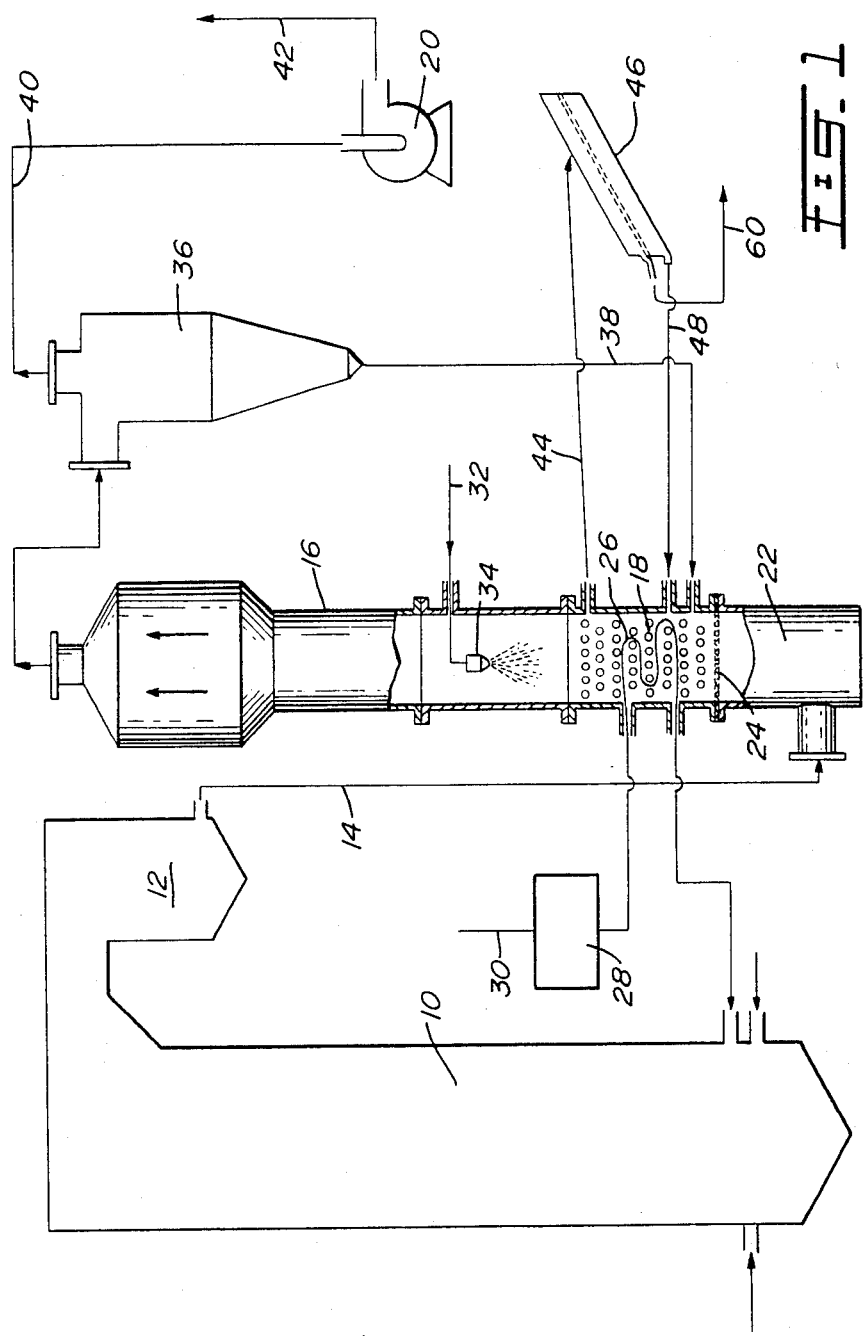
FIG. 1 is a schematic illustration of one form of the present invention.

As shown in FIG. 1 flue gases from the boiler 10 pass through the economizer section 12 and then in the illustrated arrangement by via line 14 directly into the fluidized bed unit 16.

The unit 16 is composed of a fluidized bed 18 of pellets, these pellets are generated and grow in the bed and generally will have the composition of a combined product formed by the reaction of the $SO_2$ in the flue gas with the reactant or absorbent chemicals added in an aqueous medium to the bed. If the flue gas contains fly ash the fly ash will also be substantially removed from the gas in the fluid bed and will be bound by the reaction product into the pellets being formed. In this manner, water in the aqueous medium is not spray-dried by the flue gas but allows prolongation of the scrubbing time between said reaction chemical and flue gas. Thereafter said water leaves with the gases exhaused from the bed.

To generate the fluidized bed 18 the flue gas may be drawn by a blower 20 into the plenum chamber 22 at the bottom of the unit 16 and then through a suitable grid or defuser plate 24 and into the bed 18 to fluidize same. The term fluidized bed as used herein is intended to include conventional fluid beds, circulating fluid beds (fast moving fluid transport systems wherein the pellets are carried in the gas stream, separated and returned to a point of introduction), spouting beds, etc.

A suitable heat exchanger 26 may be provided within the bed to absorb heat entering the bed with the hot flue gases forming the fluidizing medium. If sufficient heat is available the exchanger 26 may be provided and the heat extracted from the bed via heat exchanger 26 and be used, for example, to preheat the boiler feed water or to preheat the combustion air. In the illustrated arrangement heat may be extracted from the flue gas in the heat exchanger 28 or in the exchanger 26 or both and used to preheat the combustion air in line 30. The exchanger 28 may be used to fine tune the temperature of the flue gas entering the unit 16. Normally the exchanger 26 will be omitted, unless the flue gas temperature is much higher than say 400°–500° F. (200°–260° C.) as otherwise the evaporation of the absorbing solution will not be able to bring about the exhaust gas temperature within the minimum required 40°–115° C. and preferably 100°–200° F. range (40°–100° C.).

The absorbent slurry (absorbent or reaction chemical in an aqueous medium) in the illustrated arrangement enters the system via a line 32 and is sprayed onto the top of the bed via spray nozzle 34. This spray is adjusted to project the slurry into the bed 18 wherein it is intimately mixed with and generally coats the pellets and contacts the gases passing up through the bed. This absorbent slurry may contain a dissolved or slurried alkali such as lime, magnesium oxide, dolomitic lime, limestone, soda ash, treated fly ash, dolomite, etc.

While the slurry is indicated as sprayed onto the top of the bed 18 via nozzle 34 it may also be injected directly into the bed by nozzles located in and preferably adjacent the bottom of the bed 18 to facilitate contact of the $SO_2$ with the reactant chemical in the slurry and ensure that the water in the slurry or solution evaporates.

If desired, the reacting chemical may be introduced dry to the bed but this increases the reaction time and may limit the effectiveness of the process. The dry injection process will normally not be used if it is intended to capture fly ash as well as $SO_2$.

It is preferred not to introduce the absorbent chemical in slurry form before diffuser plate 24 or inlet orifice depending on the type of fluidized bed employed as some difficulty may be encountered by plugging of the diffuser plate or orifice.

In any event it is essential that the solution containing the reaction chemical at spray nozzle 34 be adjusted in concentration and feeding rate so that the gases leaving the fluidized bed unit 16 preferably be at a temperature in between 100° F. and 200° F. (40°–100° C.) or 10°–30° F. (5°–15° C.) higher than the temperature at which the condensation of the gas moisture starts to occur.

The flue gases leaving the fluidized bed unit 16 pass through a cyclone 36 where the small particles or pellets entrained in the gas stream are removed. These removed particles are carried via a line 38 and injected into the bed 18. The cleaned gas passes via line 40 to the induced draft fan or blower 20 and may be exhausted to atmosphere via line 42. If necessary a bag house may be provided downstream of the cyclone 36 to do the final cleanup.

Particles are generated in the bed 18 by the reaction of the $SO_2$ in the flue gas with the reaction chemical, say lime, sprayed into the bed preferably in an aqueous medium, i.e., the $SO_2$ reacts with the lime to form calcium sulphite and sulphate. The particles may grow to provide pellets of larger size by a variety of mechanisms. For example, particles or pellets may agglomerate with other particles or pellets to form pellets. Growth may also be achieved by the formation of further calcium sulphite and/or sulphate directly on the pellets or particles by coating the surfaces of the pellets with reaction chemical and reacting same in situ with $SO_2$ in the flue gas, i.e., the absorbent slurry may wet the surface of pellets or particles in the bed and the reaction take place on the surface of the particles or pellets. The heat of the flue gas evaporates the water forming the medium which is carried as water vapour in the gas stream from the bed through the exhaust line 40 so that the bed 18 is formed essentially of dry particles or pellets with substantially all the moisture entering the bed being evaporated and carried out with the stripped flue gases. The concentration of the scrubbing solution is such that the flue gases leaving the fluid bed are not saturated and to insure there is sufficient energy available in the flue gas to evaporate all the water. Preferably the minimum concentration of scrubbing solution to meet the above constraints will be used to obtain maximum scrubbing efficiency.

Particles and pellets are bled from the bed 18 via line 44 preferably screened via screens 46 with the fines being returned to the bed 18 via line 48. The larger particles or pellets are discarded from the system via line 60, and provide a dry by-product that may be used in any convenient manner.

In some cases, to minimize chemical consumption, i.e. to increase chemical utilization, it may be desirable to bleed off a portion of the material in lines, 38, 44, 48 or 60 and utilize this material to form a portion of the absorbent slurry added in line 32.

In the arrangement illustrated the flue gas from the boiler passes directly via line 14 into the fluidized bed 18 and thus a significant portion of fly ash carried in the gas will be separated from the gas in the fluid bed and will tend to agglomerate into pellets and will be eventually removed via the lines 60 and 26. Thus the arrangement illustrated provides a means for removal of both $SO_2$ and fly ash from the system.

It will be apparent that the dry product bled from the beds permits the production of materials that may easily be handled for disposal or for transport to other locations for chemical recovery. For example, if sodium hydroxide is used as the absorbing chemical sodium sulfite or sodium sulfate will be produced and this material could be used as make up chemical in the pulp and paper industry.

That relatively low temperature of fluidization is required to provide sufficient time for the reaction chemical to efficiently scrub said flue gas, and to prolong said scrubbing by the corresponding prolongation of the period required for drying out the liquid, avoiding flashing out of liquid which produces gas-solid reaction absorption inhibiting the stripping out of $SO_2$ (when higher temperatures are used), while yet at a temperature sufficiently high to avoid the unwanted dew-point phase situation. At this low temperature the energy used is just enough to dry. The energy not required may be advantageously converted prior to fluidization to more useful ends, by means of suitable heat exchangers. Also in comparison to the prior art, a shallow bed, may be used and to that extent, the pressure drop across the bed is reduced, all this adding to increasing the economic advantages over the prior art.

EXAMPLES

Figure 2:
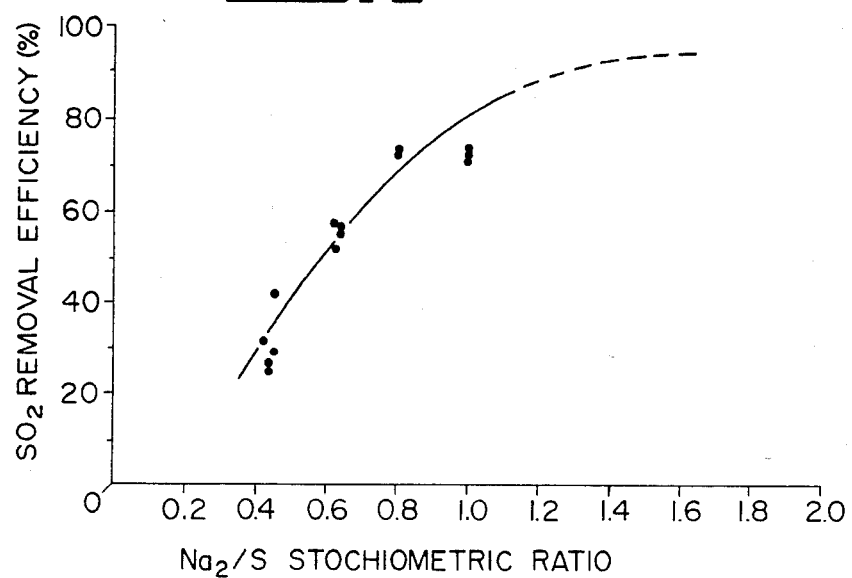
FIG. 2 is a graph obtained from the results of table 1, illustrating the relationship between $SO_2$ removal efficiency and the stochiometric ratio, (that is the mole ratio of $Na_2/S$) using a fluidized bed.

A number of tests were carried out in the laboratory using a 12 inch diameter fluid bed having a grid with about a 4% open area supporting an inert bed of about 3 inches initial static height. The fluidization of the bed particles which had a mean size (diameter) of about 800 microns resulted in a pressure drop across the bed of approximately 2-4 inches of water. The tests were all carried out using an absorbing solution of 10% $Na_2CO_3$ in water. Results are shown in Table 1.

mental operations depended on the length of the experimental run. From the results shown in Table 1, the curve shown in FIG. 2 was derived. In summary said curve illustrate that for inlet gas temperature of 150°–165° C., a gas outlet temperature 90°–115° C., a gas residence time in the system of about 4 seconds, a gas residence time in the fluid bed of less than 0.2 second and for an inlet gas having $SO_2$ concentration of 850–1050 ppm the % removal efficiency was found to depend on the $Na_2$/S stochiometric ratio. From the results shown in Table 1 and as seen from FIG. 2 derived from Table 1 a substantial removal of $SO_2$ gas, more than 90% could theoritically be obtained with a supply of absorbent equivalent to about 1.5 moles $Na_2CO_3$ per mole of $SO_2$. However, due to equipment constraints the test using $Na_2$ to S ratios above about 1 (using concentration of $Na_2CO_3$ of 10%) could not be tried. It is apparent that high efficiencies will be obtained with higher $Na_2$ to S ratio up to a practical limit that can be 1 easily found for any given set of conditions.

Figure 3:
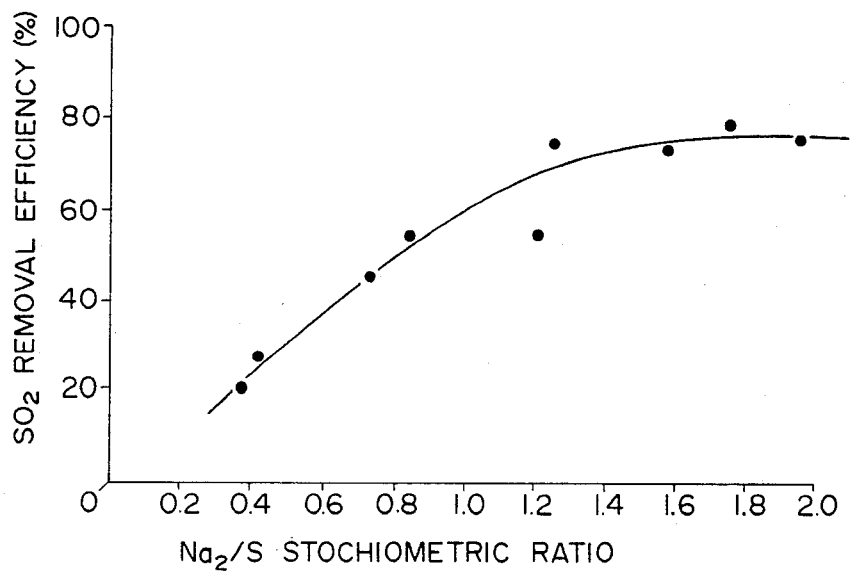
FIG. 3 is another graph illustrating that relationship between $SO_2$ removal efficient and the stoichiometric ratio using just a spray drying of $SO_2$ without a fluidized bed, for sake of comparison.

For sake of comparison and to demonstrate an advantage of the present invention, and eight foot tall spray dryer with a mean gas residence time of about four seconds and 10% $Na_2CO_3$ solution as the absorbing solution was used to treat $SO_2$ contaminated gas. The results are illustrated in FIG. 3. It is easily seen that in the absence of a fluidized bed, in order to obtain an efficiency of about 70%, an absorbent consumption equivalent to about 1.5 moles $Na_2CO_3$ per mole of $SO_2$ is required as compared to about 0.8–1.0 as evidence from the examples from table 1 above in the presence of a fluid bed. The experimental conditions used to obtain FIG. 3 were as follows:

Gas inlet temperature: 135°–145° C.
Gas outlet temperature: 45°–90° C.
Gas inlet $SO_2$ concentration: 1150–1250 ppm.

Contrary to the prior art, the applicant's invention enables the removal of $SO_2$ from gas with a single device and with minimal energy (just enough to dry) thereby saving energy cost and capital investment.

Modifications may be made without departing from the spirit of the invention as defined in the appended claims.

I claim:

1. In a method of using fluidized bed for stripping

TABLE 1

| Gas flow (Standard Cu ft/min) | Absorbing Sol. flow (Imp. Gal/min) | Gas Temperature (°C.) Inlet | Gas Temperature (°C.) Outlet | $SO_2$ Concentration in gas (PPM) Inlet | $SO_2$ Concentration in gas (PPM) Outlet | $Na_2$/S Mole Ratio (2) | $SO_2$(1) Removal eff. (%) | Absorbent Utilization (1) ÷ (2) (%) |
|---|---|---|---|---|---|---|---|---|
| 118 | 0.7 | 156 | 111 | 854 | 648 | 0.4 | 24.1 | 60.3 |
| 118 | 0.7 | 155 | 112 | 854 | 628 | 0.4 | 26.5 | 66.3 |
| 118 | 0.7 | 155 | 110 | 844 | 579 | 0.4 | 31.4 | 78.5 |
| 115 | 1.0 | 165 | 117 | 855 | 373 | 0.6 | 56.4 | 94.0 |
| 115 | 1.0 | 167 | 113 | 855 | 383 | 0.6 | 55.2 | 92.0 |
| 115 | 1.0 | 162 | 112 | 835 | 405 | 0.6 | 51.7 | 86.2 |
| 115 | 1.0 | 160 | 108 | 835 | 353 | 0.6 | 57.7 | 96.2 |
| 116 | 1.5 | 155 | 97 | 825 | 216 | 1.0 | 73.8 | 73.8 |
| 116 | 1.5 | 157 | 91 | 835 | 246 | 1.0 | 70.5 | 70.5 |
| 116 | 1.5 | 159 | 91 | 835 | 226 | 1.0 | 72.9 | 72.9 |
| 116 | 1.5 | 158 | 87 | 835 | 236 | 1.0 | 71.7 | 71.7 |
| 112 | 1.5 | 150 | 102 | 1058 | 294 | 0.8 | 72.2 | 90.3 |
| 112 | 1.5 | 150 | 104 | 1058 | 282 | 0.8 | 73.3 | 91.6 |

In all of the above tests an absorbent utilization of up to 96% could be achieved, and dry spent absorbent layers ($Na_2SO_3$:$Na_2SO_4$:$Na_2CO_3$) encapsulating the original bed pellets were consistently observed. The thickness of these layers due to the batch type experi- $SO_2$ from gases by providing a bed of pellets, passing $SO_2$ containing gases through said bed to fluidize said pellets and to form a fluidized bed of said pellets, injecting into said bed at least one aqueous chemical selected from the class consisting of alkali and alkaline earth material reactive with sulfur dioxide to form a non-volatile compound, reacting at least a portion of said $SO_2$ with said chemical in said fluidized bed to form a combined product, combining said combined product with previously formed product and to discard a portion of the improvement comprising adjusting the concentration and feed rate of said reaction chemical as to exhaust gases from said bed at a temperature as low as possible below 115° C. but high enough and above 40° C. to prevent the condensation of the moisture present in the gas stream, thereby the water of the aqueous reaction chemical being not spray-dired by said $SO_2$ containing gases but allowing prolongation of the scrubbing time between said reaction chemical and said $SO_2$ containing gases, to exhaust gages from said bed substantially free of $SO_2$ and thus eliminating the need of auxiliary scrubbing elements that are typically used in association wiht fluidized bed $SO_2$ removal.

2. A method as defined in claim 1 wherein said aqueous reaction chemical is introduced to said bed as an aqueous medium having about 10% reaction-chemical concentration, transferring heat from said gases to said bed, evaporating said aqueous medium, carrying said evaportated aqueous medium from said bed in a cooled stream of said gases leaving said bed, whereby at said temperature which is as low as possible, sufficient time is provided for the reaction chemical to efficiently scrub by the corresponding prolongation period required for drying out the liquid thereby enhancing $SO_2$ removal.

3. A method as defined in claim 2 further comprising absorbing heat from said bed with a heat exchanger embedded in said bed in order to help maintaining said temperature as low as possible.

4. A method as defined with claim 1 further comprising absorbing heat from said bed with a heat exchanger embedded in said bed in order to help maintaining said temperature as low as possible.

5. The method as defined in claim 1, 2 or 3 wherein the temperature of said exhausting gases ranges between 100° F. and 200° F. (40°–100° C).

6. A method as defined in claims 1 or 2 wherein said gases are flue gases from a combustion of sulphur containing fuels and wherein said gases also contain fly ash, said process further comprising uniting said fly ash with said combined product in said bed to form said pellets.

7. A method as defined in claims 1 or 2 wherein said gases are flue gases from a combustion of sulphur containing fuels.

8. The method as defined in claim 1 wherein said chemical is sodium carbonate present in stoichiometric ratio of between 1 and 1.5.

* * * * *